United States Patent
Liu

(10) Patent No.: US 10,314,432 B2
(45) Date of Patent: Jun. 11, 2019

(54) STOVE

(71) Applicant: Chia-Ming Liu, Douliou (TW)

(72) Inventor: Chia-Ming Liu, Douliou (TW)

(*) Notice: Subject to any disclaimer, the term of this patent is extended or adjusted under 35 U.S.C. 154(b) by 546 days.

(21) Appl. No.: 15/211,530

(22) Filed: Jul. 15, 2016

(65) Prior Publication Data

US 2017/0311755 A1  Nov. 2, 2017

(30) Foreign Application Priority Data

Apr. 27, 2016 (CN) ..................... 2016 2 0365399 U

(51) Int. Cl.
| | | |
|---|---|---|
| *A23B 4/052* | (2006.01) | |
| *A47J 37/07* | (2006.01) | |
| *F24C 15/08* | (2006.01) | |

(52) U.S. Cl.
CPC ........... *A47J 37/0704* (2013.01); *A23B 4/052* (2013.01); *A47J 37/0786* (2013.01); *F24C 15/08* (2013.01)

(58) Field of Classification Search
CPC ...... A23B 4/052; A23B 4/044; A47J 37/0704; A47J 37/0786; A47J 37/07; F24C 15/08; F24C 15/026
USPC ........... 126/25 R, 275 R, 273 A, 20; 99/339, 99/340; 219/398, 720
See application file for complete search history.

(56) References Cited

U.S. PATENT DOCUMENTS

| | | | | |
|---|---|---|---|---|
| 3,714,885 | A * | 2/1973 | Wertheimer | A47J 37/0676 219/524 |
| 5,611,264 | A * | 3/1997 | Studer | A47J 27/14 99/340 |
| 6,073,624 | A * | 6/2000 | Laurent | A47B 46/005 126/273 A |
| 7,069,924 | B2 * | 7/2006 | Kuttalek | F24C 15/027 126/273 R |
| 9,295,361 | B2 | 3/2016 | Liu | |
| 2014/0102434 | A1 * | 4/2014 | Liu | F24C 15/026 126/25 R |
| 2015/0013662 | A1 * | 1/2015 | Norris | A47J 37/0713 126/25 R |

* cited by examiner

*Primary Examiner* — Dana Ross
*Assistant Examiner* — Joseph W Iskra
(74) *Attorney, Agent, or Firm* — Muncy, Geissler, Olds & Lowe, P.C.

(57) ABSTRACT

A stove includes a stove unit having a top grilling surface, a cover unit, a guiding unit, and a balance-providing unit having a cross bar, at least one mounting seat, and at least one constant-force spring that is mounted on the at least one mounting seat and that is connected to the cross bar. During the movement of the cover unit in a top-bottom direction, the at least one constant-force spring provides a substantially constant resilient force which counteracts a weight of the cover unit to position the cover unit at any point between a lifted position, where the cover unit is spaced apart from the top grilling surface, and a cover position, where the cover unit covers the top grilling surface.

7 Claims, 13 Drawing Sheets

STOVE

CROSS-REFERENCE TO RELATED APPLICATION

This application claims priority of Chinese Patent Application No. 201620365399.8, filed on Apr. 27, 2016.

FIELD

The disclosure relates to a stove, and more particularly to a dual-function stove that is capable of grilling and smoking food.

BACKGROUND

Referring to FIGS. 1 and 2, a conventional stove, as disclosed in U.S. Pat. No. 9,295,361, includes a stove unit 61, a supporting frame 62, a cover unit 63, a guiding unit 64, a cantilever unit 65, and a shelf unit 66. The stove unit 61 has a top grilling surface 611. The supporting frame 62 is disposed behind the stove unit 61 and extends in a top-bottom direction (Y). The cover unit 63 is disposed above the top grilling surface 611 of the stove unit 61, is connected to the supporting frame 62, and is movable in the top-bottom direction (Y). The guiding unit 64 has a pair of guiding elements 641 (only one is visible in FIG. 2) that are disposed on the supporting frame 62, and a pair of sliding elements 642 (only one is visible in FIG. 2) that are disposed on the cover unit 63 and that cooperate with the guiding elements 641 to retain up-and-down movement of the cover unit 63 in the top-bottom direction (Y) relative to the top grilling surface 611 of the stove unit 61. The cantilever unit 65 is pivotally connected between the supporting frame 62 and the cover unit 63 to drive the up-and-down movement of the cover unit 63. The shelf unit 66 is disposed above the top grilling surface 611. When the cover unit 63 is lifted away from the top grilling surface 611 of the stove unit 61, a space is formed between the cover unit 63 and the top grilling surface 611 of the stove unit 61 for an operator to perform grilling or barbequing action on the top grilling surface 611. When the cover unit 63 is moved downward and covers the top grilling surface 611 of the stove unit 61, a food material (not shown) which is put on the shelf unit 66 can be effectively smoked.

However, the configuration of the cantilever unit 65 being exposed outside of the cover unit 63 adversely affects the aesthetic appearance of the conventional stove, especially when the cover unit 63 and the cantilever unit 65 are accumulated with smoke and grease after long-term usage. Moreover, since the cantilever unit 65 includes a plurality of pivot joints 651, the smoke and grease accumulated on the cantilever unit 65 may obstruct pivot movement of the cantilever unit 65 and may even result in failure to move the cover unit 63 in the top-bottom direction (Y).

SUMMARY

Therefore, an object of the disclosure is to provide a stove that can alleviate at least one of the drawbacks of the prior art.

According to the disclosure, the stove includes a hollow stove unit, a cover unit, a guiding unit, and a balance-providing unit.

The stove unit has a top grilling surface, a grill plate that is disposed on the top grilling surface, a heating element that is disposed under the grill plate, and a supporting stand that extends upwardly from a rear end of the top grilling surface in a top-bottom direction.

The cover unit is disposed above the top grilling surface of the stove unit, is connected to the supporting stand, and is movable in the top-bottom direction. The cover unit includes two side walls that are opposite to each other in a left-right direction perpendicular to the top-bottom direction.

The guiding unit includes two guide rails, two upright stands, and a plurality of first and second roller units. The guide rails extend in the top-bottom direction. Each of the guide rails is disposed fixedly on an inner surface of a respective one of the side walls, and has a surrounding wall that defines a guide groove. The surrounding wall has an inner wall surface facing the guide groove, an outer wall surface opposite to the inner wall surface, and an opening extending in the top-bottom direction and communicating the guide groove. The upright stands extend in the top-bottom direction, are coupled fixedly to a rear surface of the supporting stand, and are disposed between the guide rails. The first roller units are mounted to the upright stands. Each of the first roller units includes a first roller rotatably received in the guide groove of a corresponding one of the guide rails, and is in rolling contact with the inner wall surface of the surrounding wall of the corresponding one of the guide rails. Each of the second roller units includes a second roller extending through a corresponding one of the upright stands to be in rolling contact with the outer wall surface of the surrounding wall of a corresponding one of the guide rails, such that the guide rails are slidable relative to the upright stands in the top-bottom direction.

The balance-providing unit includes a cross bar that interconnects and is co-movable with the guide rails, a connect bar that is disposed above and spaced apart from the cross bar and that interconnects the upright stands, at least one mounting seat that is secured to a bottom surface of the connect bar, and at least one constant-force spring that is mounted on the at least one mounting seat and that is connected to the cross bar.

During the movement of the cover unit in the top-bottom direction, the at least one constant-force spring provides a substantially constant resilient force which counteracts a weight of the cover unit to position the cover unit at any point between a lifted position, where the cover unit is spaced apart from the top grilling surface, and a cover position, where the cover unit covers the top grilling surface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
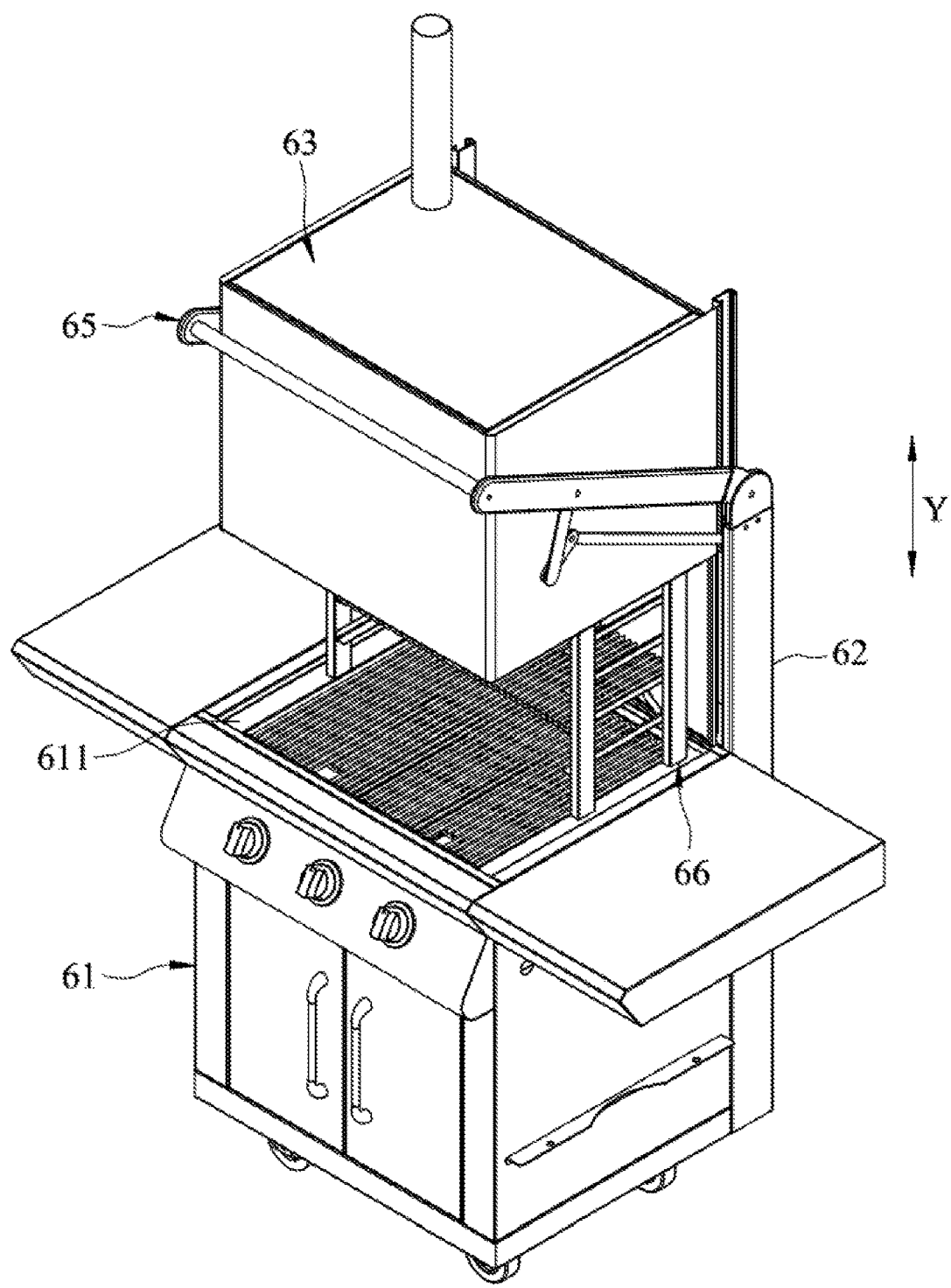
FIG. 1 is a perspective view of a conventional stove disclosed in U.S. Pat. No. 9,295,361.
Figure 2:
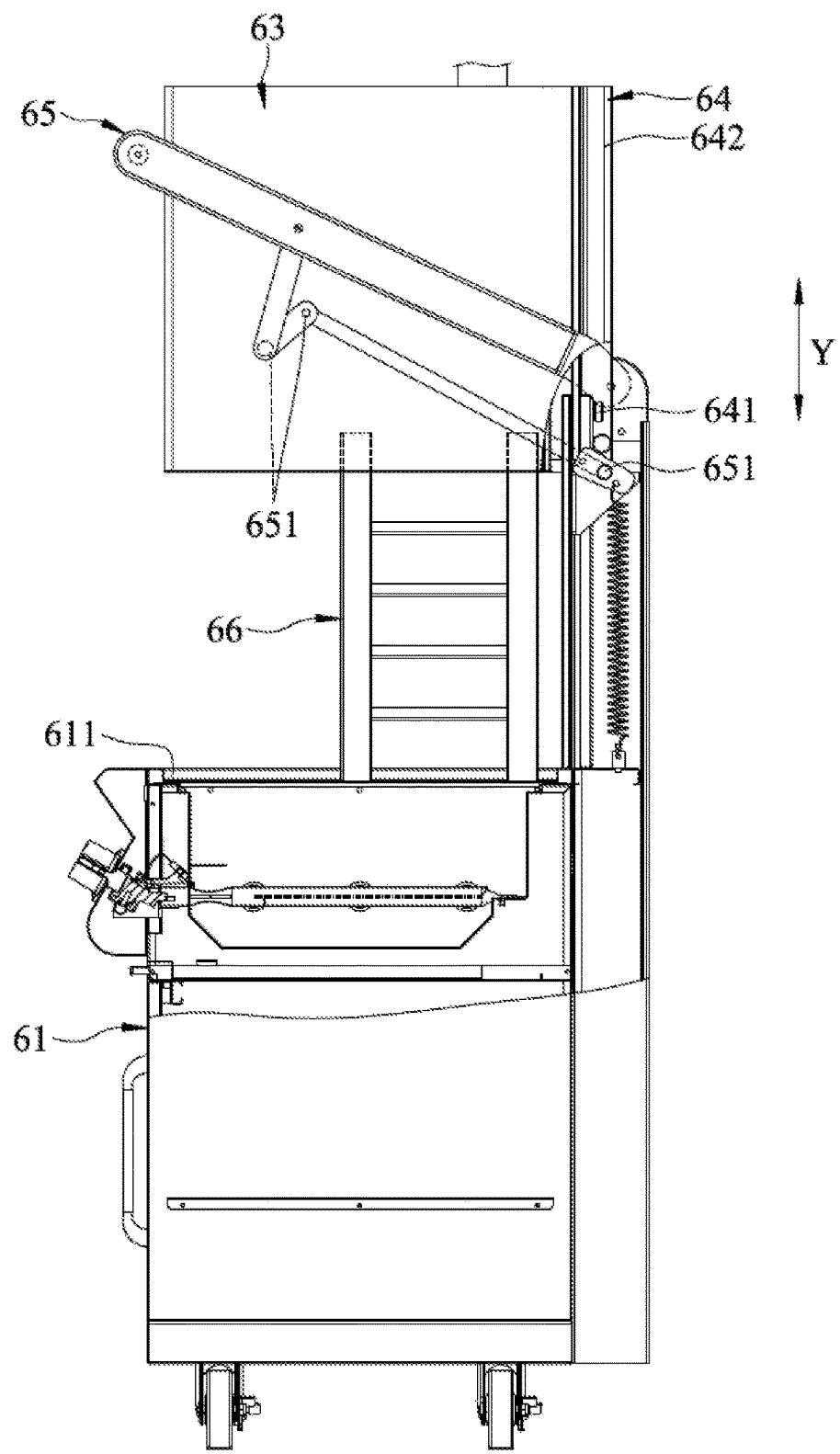
FIG. 2 is a side view of the conventional stove disclosed in U.S. Pat. No. 9,295,361.
Figure 3:
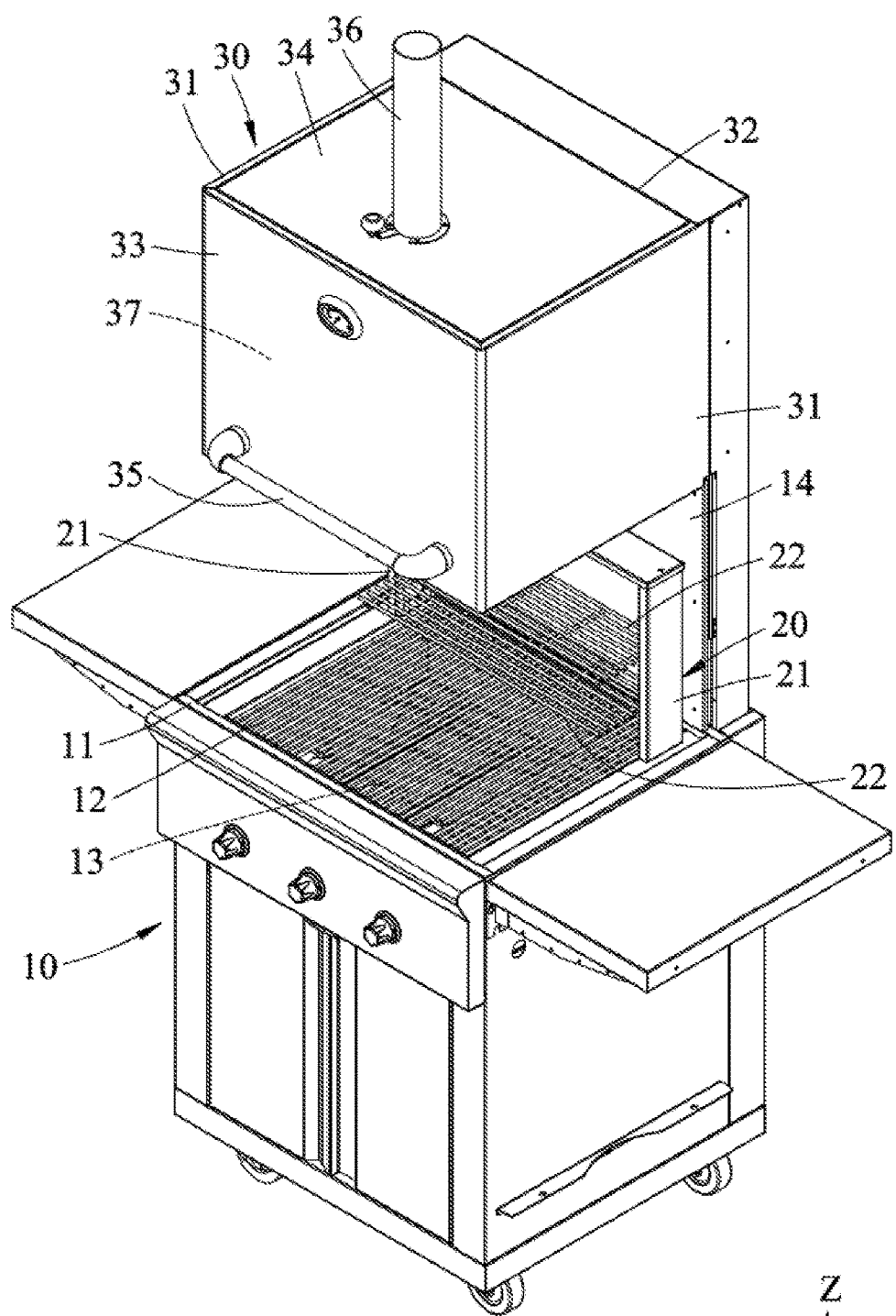
FIG. 3 is a front perspective view of an embodiment of a stove according to the disclosure.
Figure 4:
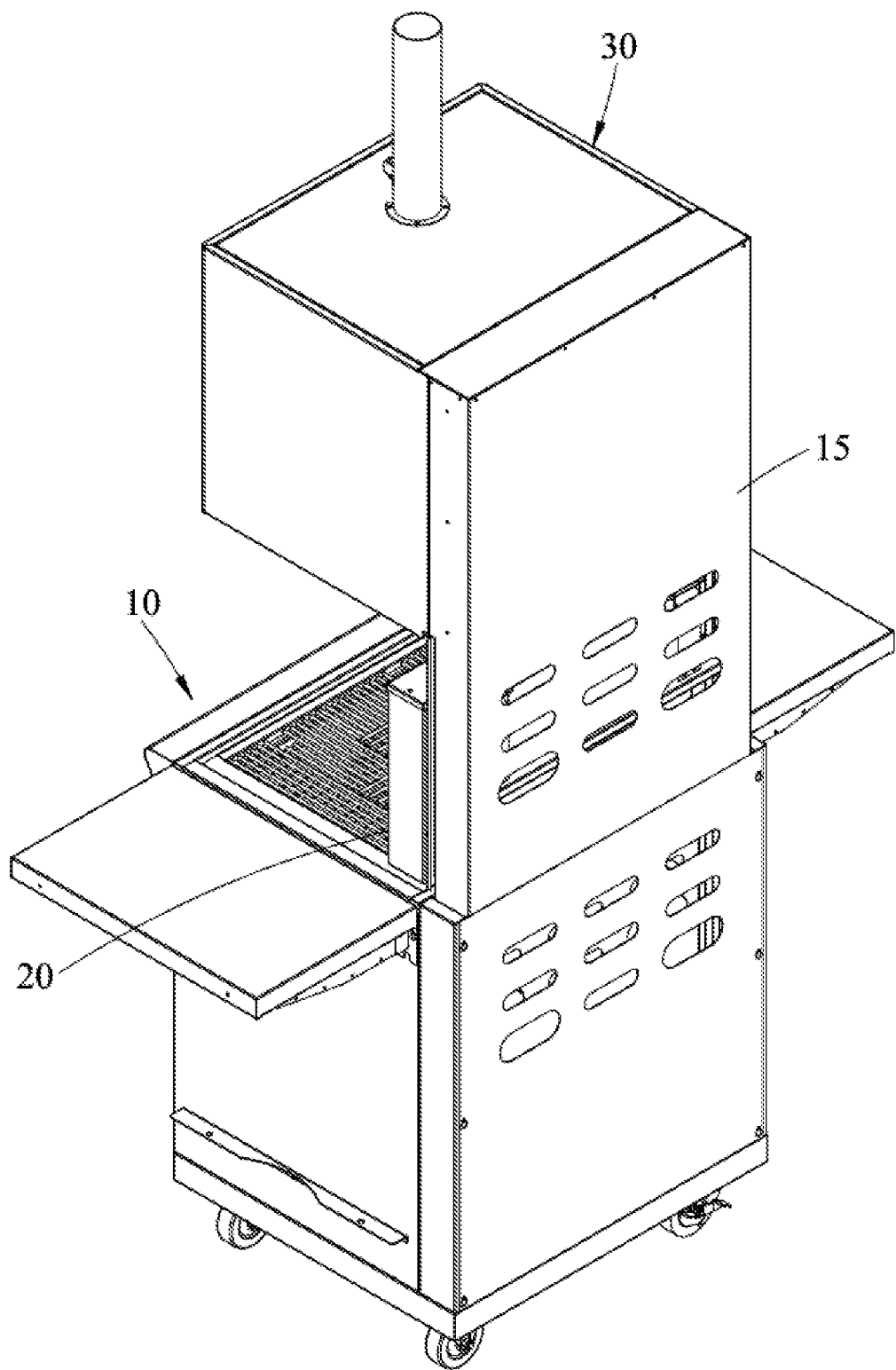
FIG. 4 is a rear perspective view of the embodiment, illustrating the cover unit at a lifted position.
Figure 5:
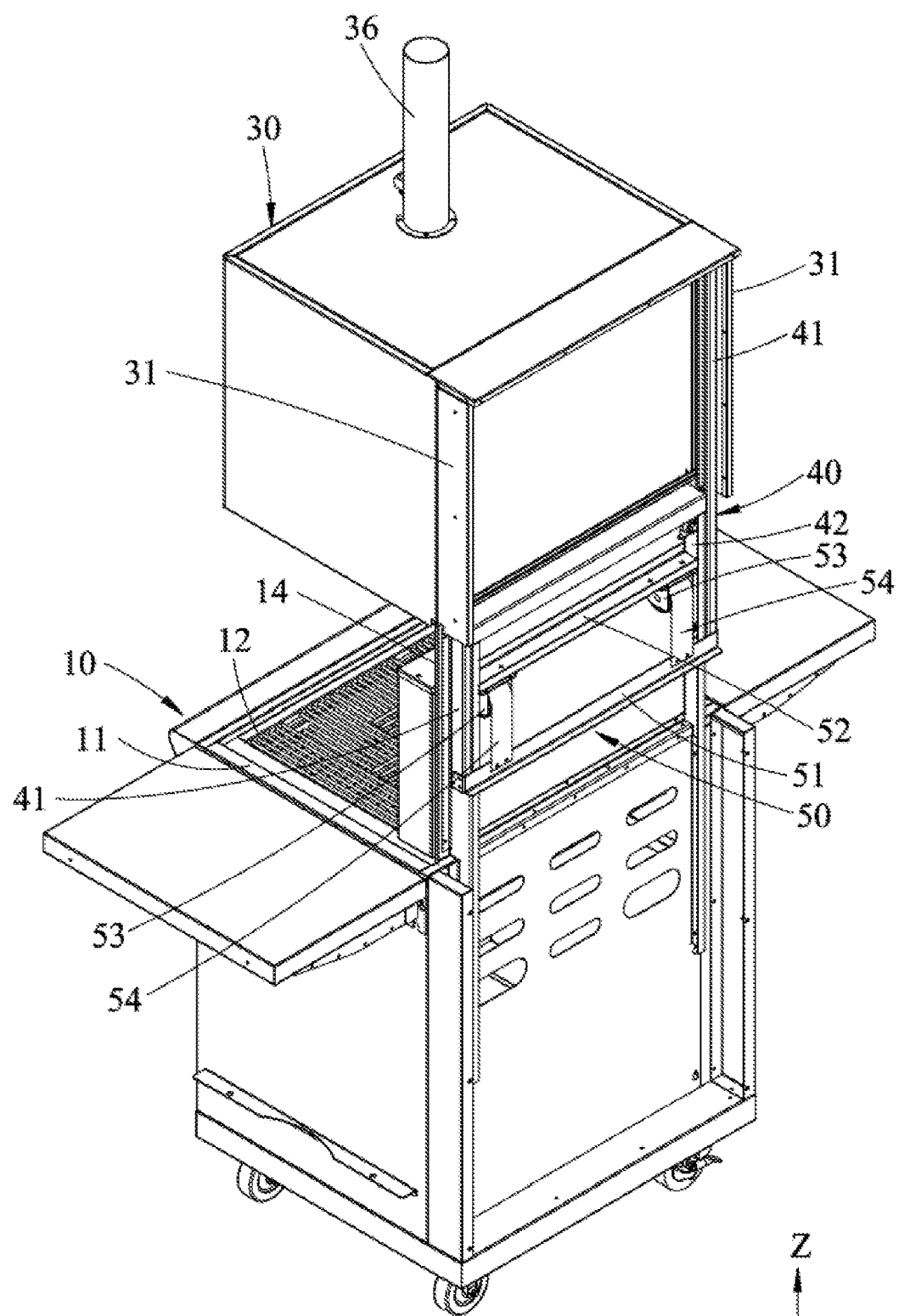
FIG. 5 is another rear perspective view with a back plate of the embodiment removed for illustrating a cover unit, a guiding unit, and a balance-providing unit of the embodiment.
Figure 6:
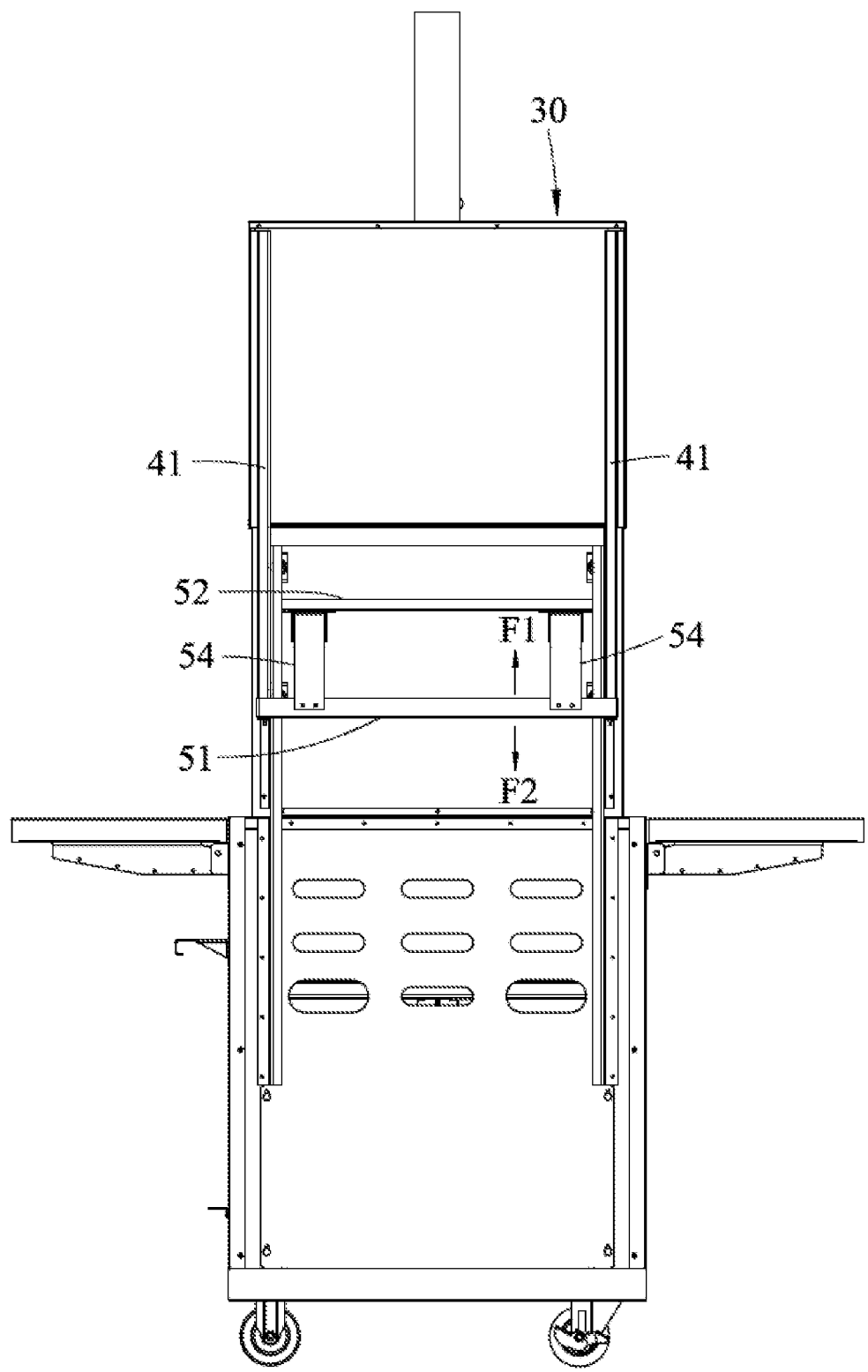
FIG. 6 is a rear view of the embodiment illustrating the cover unit at the lifted position.
Figure 7:
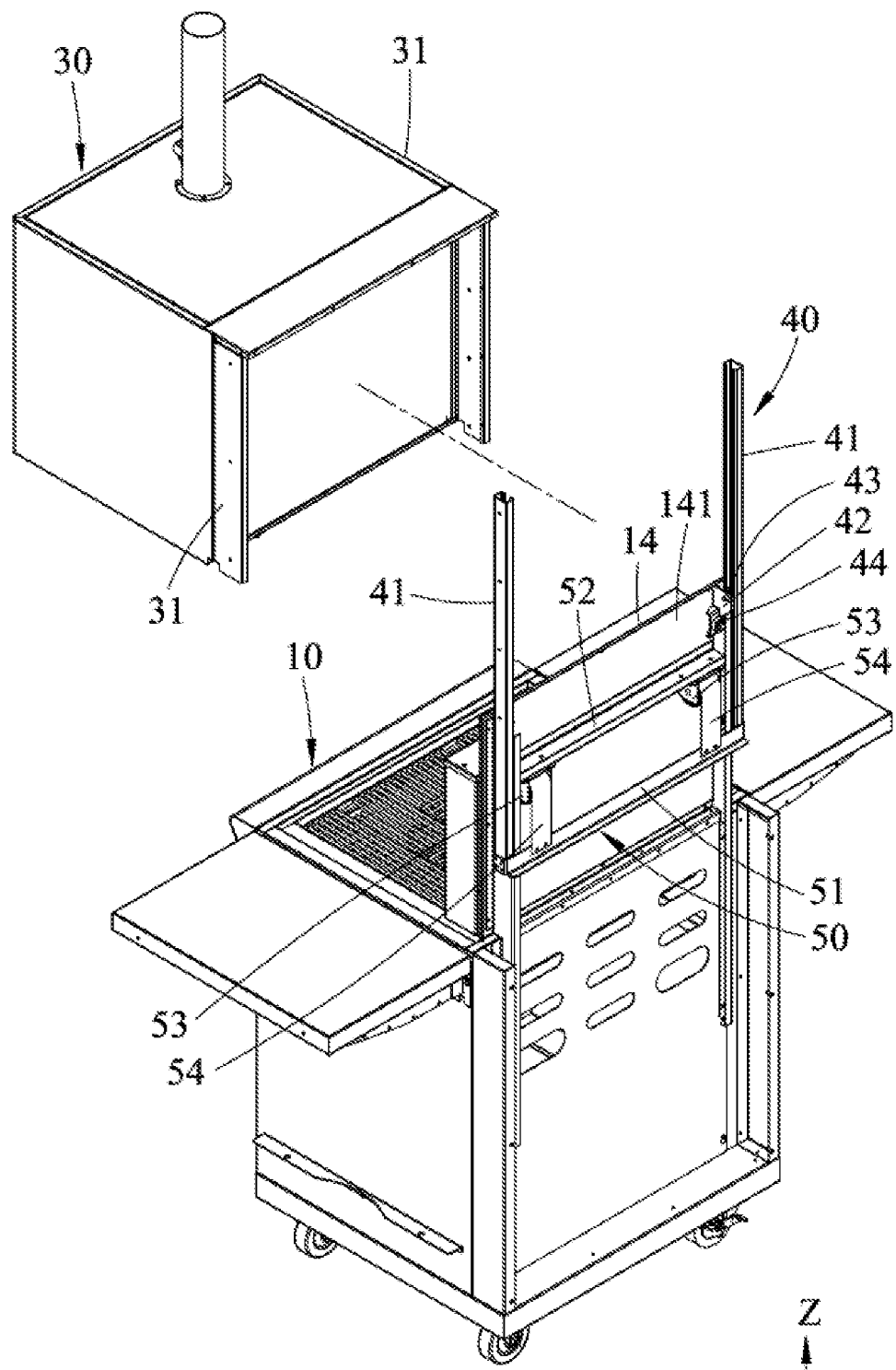
FIG. 7 is a partly exploded perspective view of the embodiment.
Figure 8:
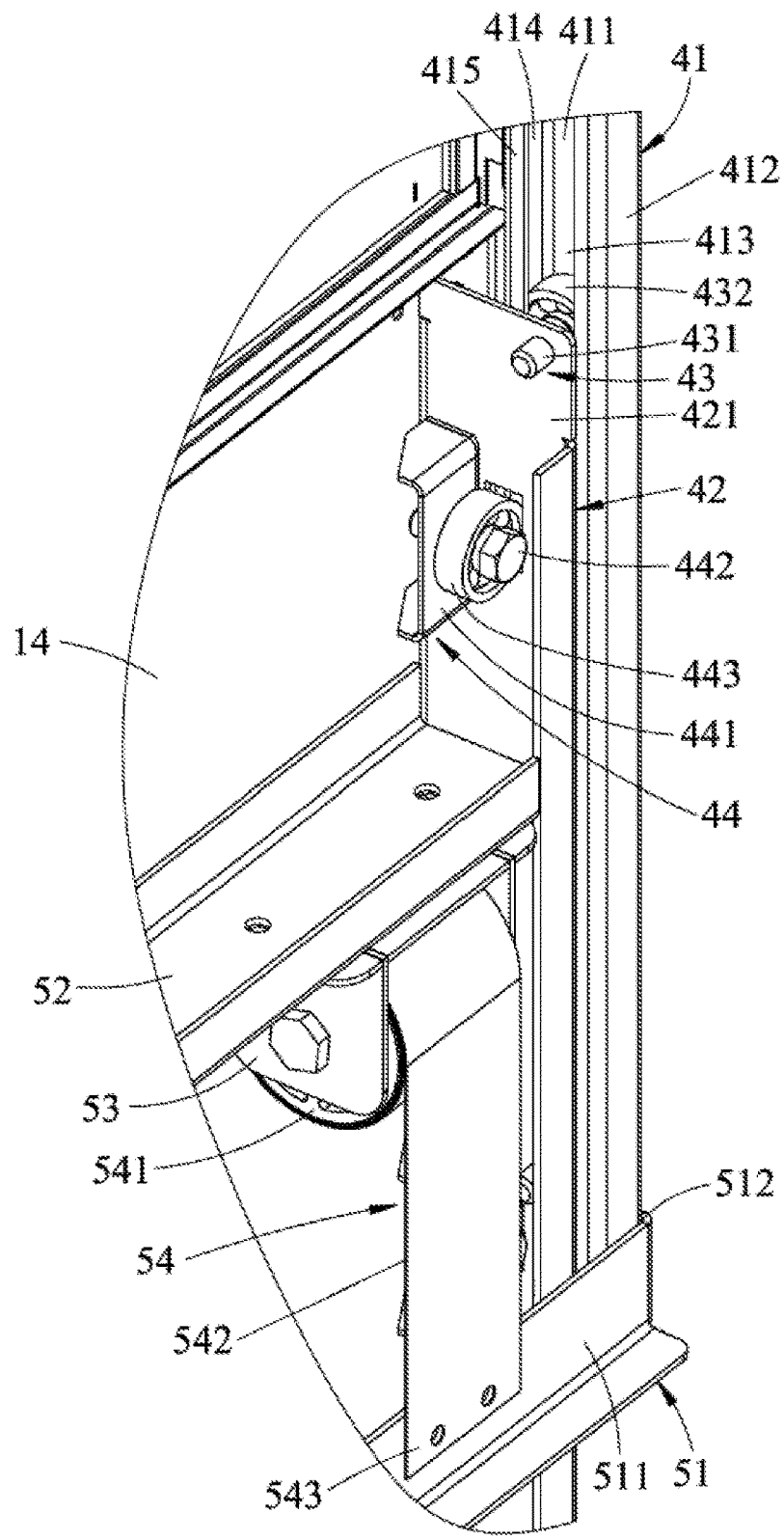
FIG. 8 is a fragmentary perspective view, illustrating the guiding unit and the balance-providing unit of the embodiment.
Figure 9:
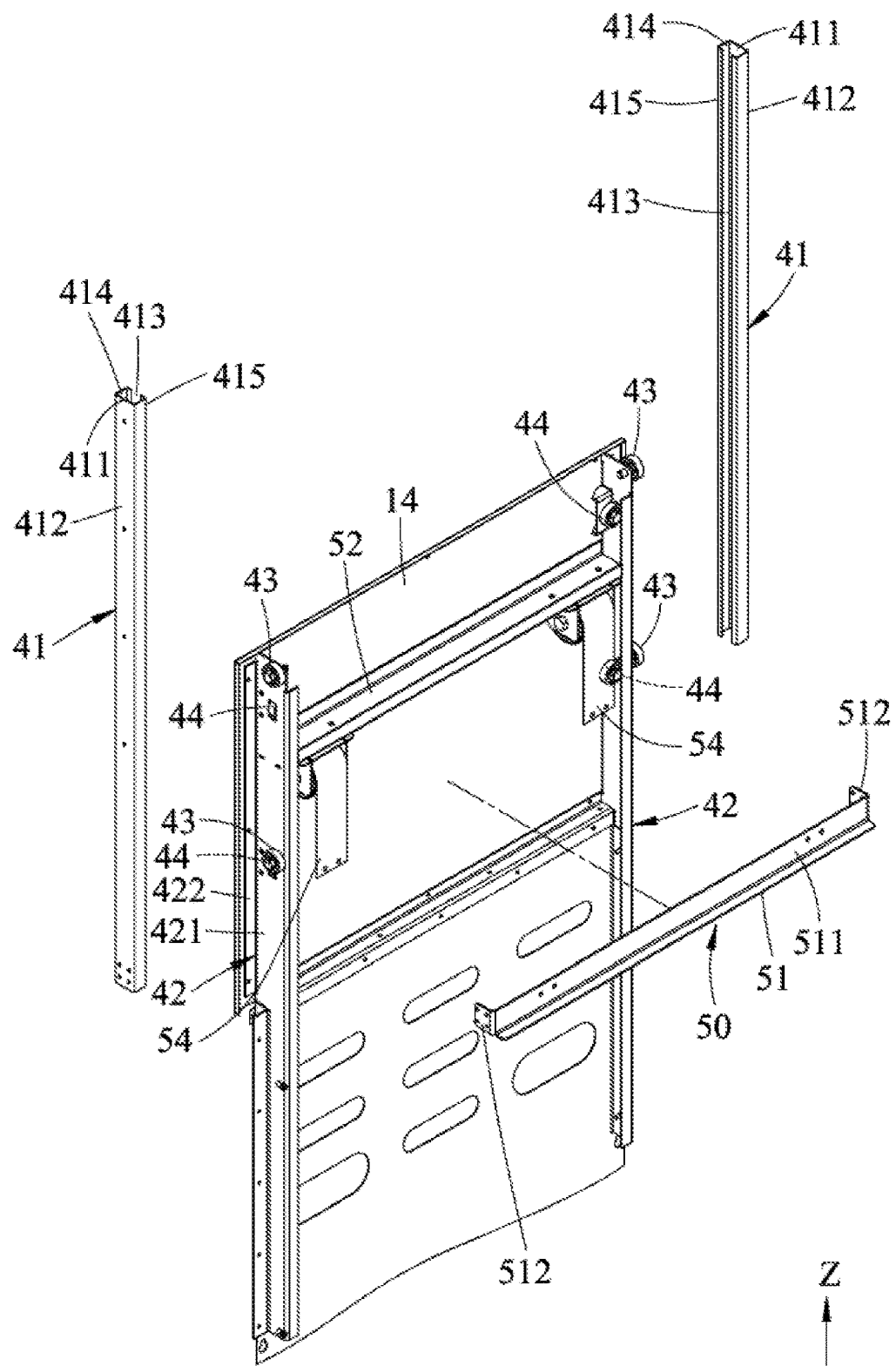
FIG. 9 is a partly exploded perspective view illustrating the guiding unit and the balance-providing unit of the embodiment.
Figure 10:
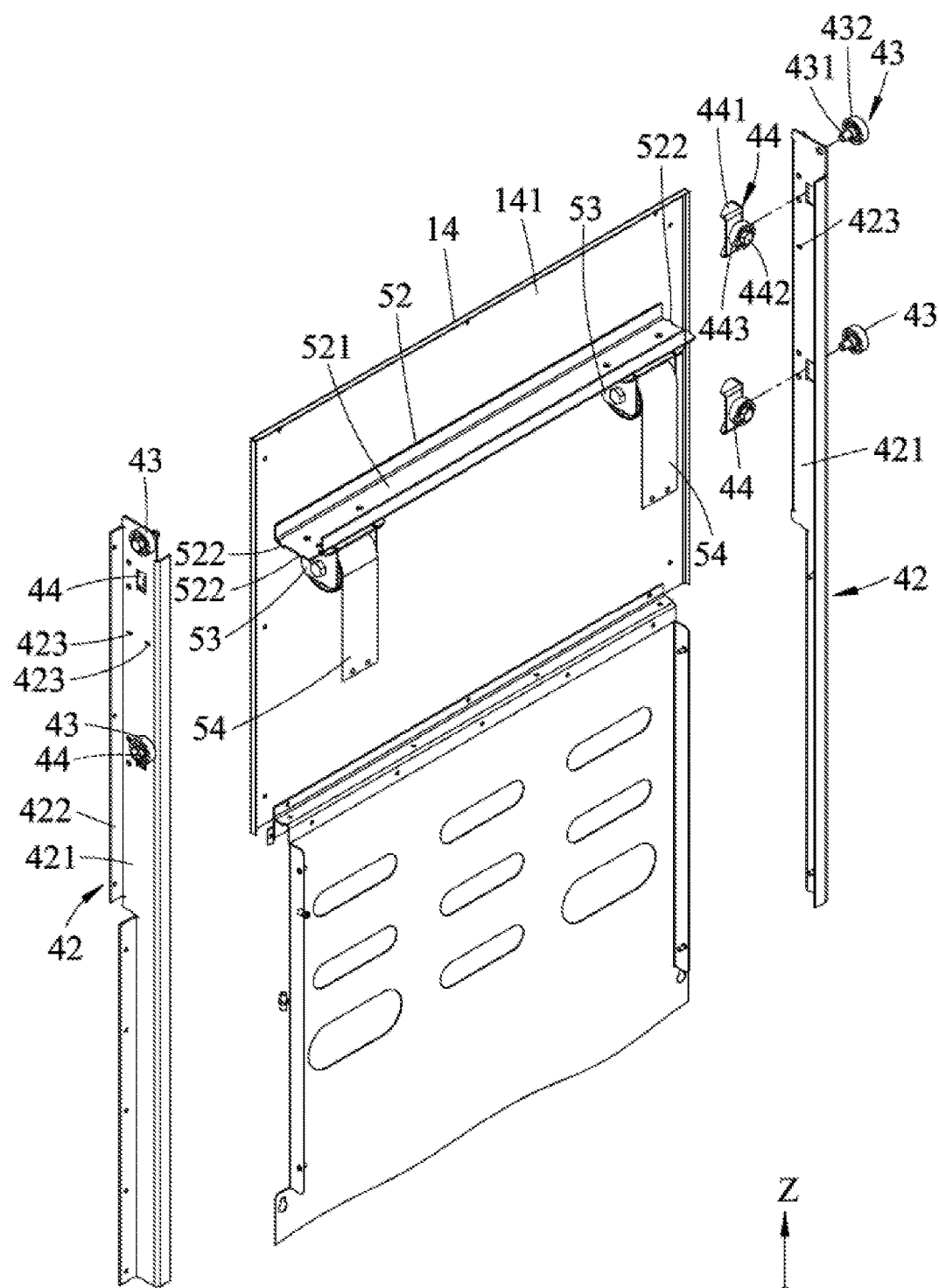
FIG. 10 is another partly exploded perspective view illustrating the guiding unit and the balance-providing unit of the embodiment.

Referring to FIGS. 3 to 5, an embodiment of a stove according to the disclosure includes a hollow stove unit 10, a rack unit 20, a cover unit 30, a guiding unit 40, and a balance-providing unit 50.

The stove unit 10 has a top grilling surface 11, a grill plate 12 that is disposed on the top grilling surface 11, a heating element 13 that is disposed under the grill plate 12, a supporting stand 14 that extends upwardly from a rear end of the top grilling surface 11 in a top-bottom direction (Z), and a back plate 15 (see FIG. 4). In this embodiment, the supporting stand 14 is fixedly connected to the top grilling surface 11.

The rack unit 20 is disposed on the top grilling surface 11 of the stove unit 10 and can be accommodated within the cover unit 30. The rack unit 20 includes two side boards 21 that are disposed in front of the supporting stand 14 and that are spaced apart from each other in a left-right direction (Y) which is perpendicular to the top-bottom direction (Z), and a plurality of gridded plates 22 that are disposed between the side boards 21 and that are for supporting a food material (not shown) thereon.

The cover unit 30 is disposed above the top grilling surface 11 of the stove unit 10, is disposed in front of and connected to the supporting stand 14, and is movable in the top-bottom direction (Z). The cover unit 30 includes two side walls 31 that are opposite to each other in the left-right direction (Y), a rear wall 32 that interconnects the side walls 31 and that is disposed in front of the supporting stand 14, a front wall 33 that is opposite to the rear wall 32 in a front-rear direction (X) which is perpendicular to the top-bottom direction (Z) and the left-right direction (Y) and that interconnects the side walls 31, a top wall 34 that is disposed on and connected to the side walls 31, the rear wall 32, and the front wall 33. The cover unit 30 further includes a handle 35 that is disposed on the front wall 33, and an exhaust pipe 36 that is disposed on the top wall 34. The side walls 31, the rear wall 32, the front wall 33, and the top wall 34 cooperatively define a chamber 37 which has a bottom open end.

Referring to FIGS. 6 to 10, the guiding unit 40 includes two guide rails 41, two upright stands 42, four first roller units 43, and four second roller units 44.

The guide rails 41 extend in the top-bottom direction (Z). Each of the guide rails 41 is disposed fixedly on an inner surface of a respective one of the side walls 31, and has a surrounding wall 412 that defines a substantially rectangular-shaped guide groove 411. The surrounding wall 412 has an inner wall surface 414 facing the guide groove 411, an outer wall surface 415 opposite to the inner wall surface 414, and an opening 413 extending in the top-bottom direction (Z) and spatially communicating the guide groove 411. In this embodiment, the openings 413 of the guide rails 41 face each other.

The upright stands 42 extend in the top-bottom direction (Z), are coupled fixedly to a rear surface 141 (see FIG. 7) of the supporting stand 14, and are disposed between the guide rails 41. Each of the upright stands 42 has a main body 421 (see FIG. 9), a fixing plate 422 bent from the main body 421 and coupled fixedly to the rear surface 141 of the supporting stand 14, and two through holes 423 (see FIG. 10).

The first roller units 43 are arranged in pairs. One pair of the first roller units 43 are mounted to one of the upright stands 42, and the other pair of the first roller units 43 are mounted to the other one of the upright stands 42. Each of the first roller units 43 includes a first roller 432 rotatably received in the guide groove 411 of a corresponding one of the guide rails 41, and being in rolling contact with the inner wall surface 414 of the surrounding wall 412 of the corresponding one of the guide rails 41. Each of the first roller units 43 further includes a first axial pin 431 extending in the left-right direction (Y) through the main body 421 of a corresponding one of the upright stands 42 into the guide groove 411 of a corresponding one of the guide rails 41 via the opening 413 of the corresponding one of the guide rails 41. For each of the first roller units 43, the first roller 432 is rotatably mounted to the first axial pin 431.

Each of the second roller units 44 includes a second roller 443 extending through the main body 421 of a corresponding one of the upright stands 42 to be in rolling contact with the outer wall surface 415 of the surrounding wall 412 of a corresponding one of the guide rails 41, such that the guide rails 41 are slidable relative to the upright stands 42 in the top-bottom direction (Z). Each of the second roller units 44 further includes a roller seat 441 coupled to the main body 421 of the corresponding one of the upright stands 42, and a second axial pin 442 extending through the roller seat 441 in the front-rear direction (X). For each of the second roller units 44, the second roller 443 is rotatably mounted to the second axial pin 442.

Figure 11:
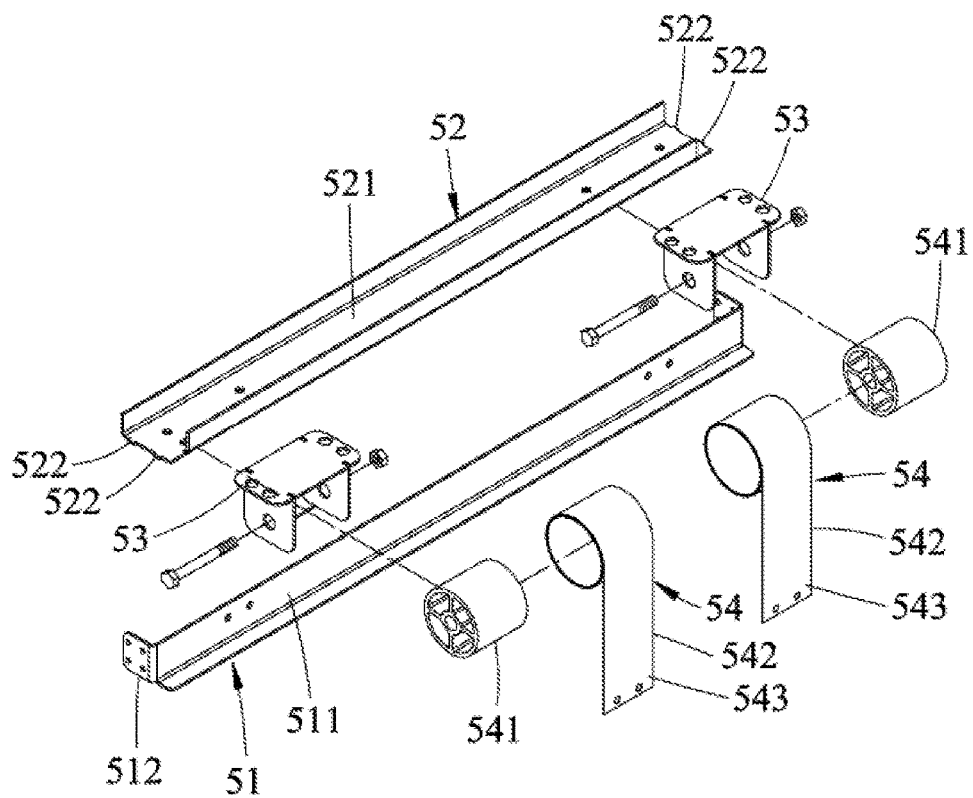
FIG. 11 is an exploded perspective view of the balance-providing unit of the embodiment.

With further reference to FIG. 11, in this embodiment, the balance-providing unit 50 includes a cross bar 51, a connect bar 52, two mounting seats 53, and two constant-force springs 54.

The cross bar 51 is disposed on bottom ends of the guide rails 41, and interconnects and is co-movable with the guide rails 41. The cross bar 51 has a base part 511 extending in the left-right direction (Y), and two lateral parts 512 respectively bent from opposite lateral ends of the base part 511, and respectively and fixedly coupled to the guide rails 41.

The connect bar 52 is disposed above and spaced apart from the cross bar 51, and interconnects the upright stands 42. The connect bar 52 has a bar body 521 extending in the left-right direction (Y), and two pairs of protrusions 522 respectively and laterally extending from opposite lateral ends of the bar body 521. Each of the protrusions 522 extends through the main body 421 of a corresponding one of the upright stands 42 via a corresponding one of the through holes 423 of the upright stands 42.

The mounting seats 53 are secured to a bottom surface of the connect bar 52, and are adjacent to the upright stands 42, respectively. The constant-force springs 54 are respectively mounted on the mounting seats 53 and are connected to the cross bar 51. Each of the constant-force springs 54 includes a spool 541 disposed rotatably in a respective one of the mounting seats 53, and a spring strip 542 rolled around the spool 541 and having a connecting port ion 543 that is connected fixedly to the base part 511 of the cross bar 51. The spring strip 542 of each of the constant-force springs 54 is an iron strip.

Referring to FIGS. 4 and 5, after the cover unit 30, the guiding unit 40, and the balance-providing unit 50 are assembled, the back plate 15 can be securely mounted to a back side of the stove unit 10 so as to provide cover and protection to the guiding unit 40 and the balance-providing unit 50.

Figure 12:
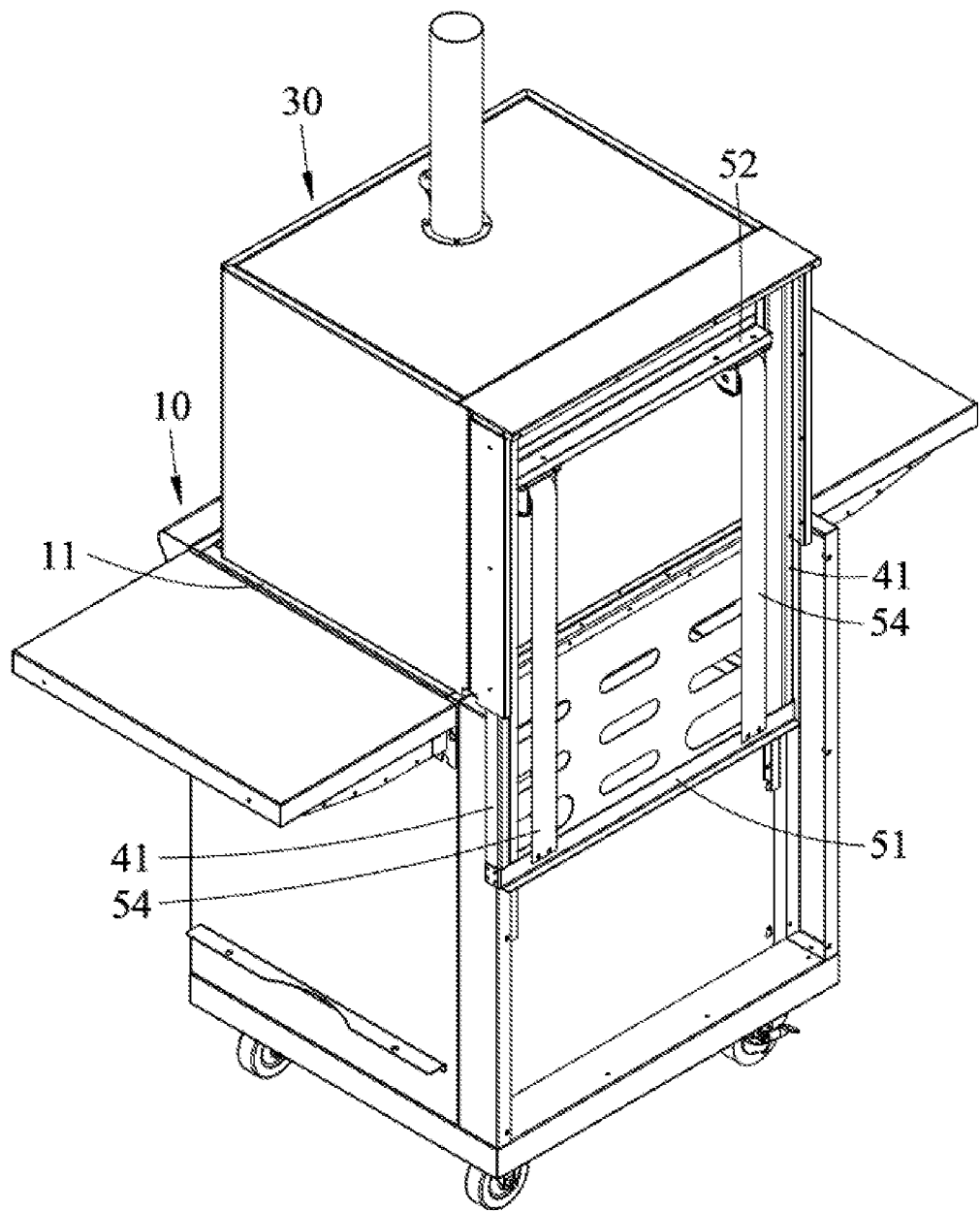
FIG. 12 is another rear perspective view of the embodiment, illustrating the cover unit at a covered position.
Figure 13:
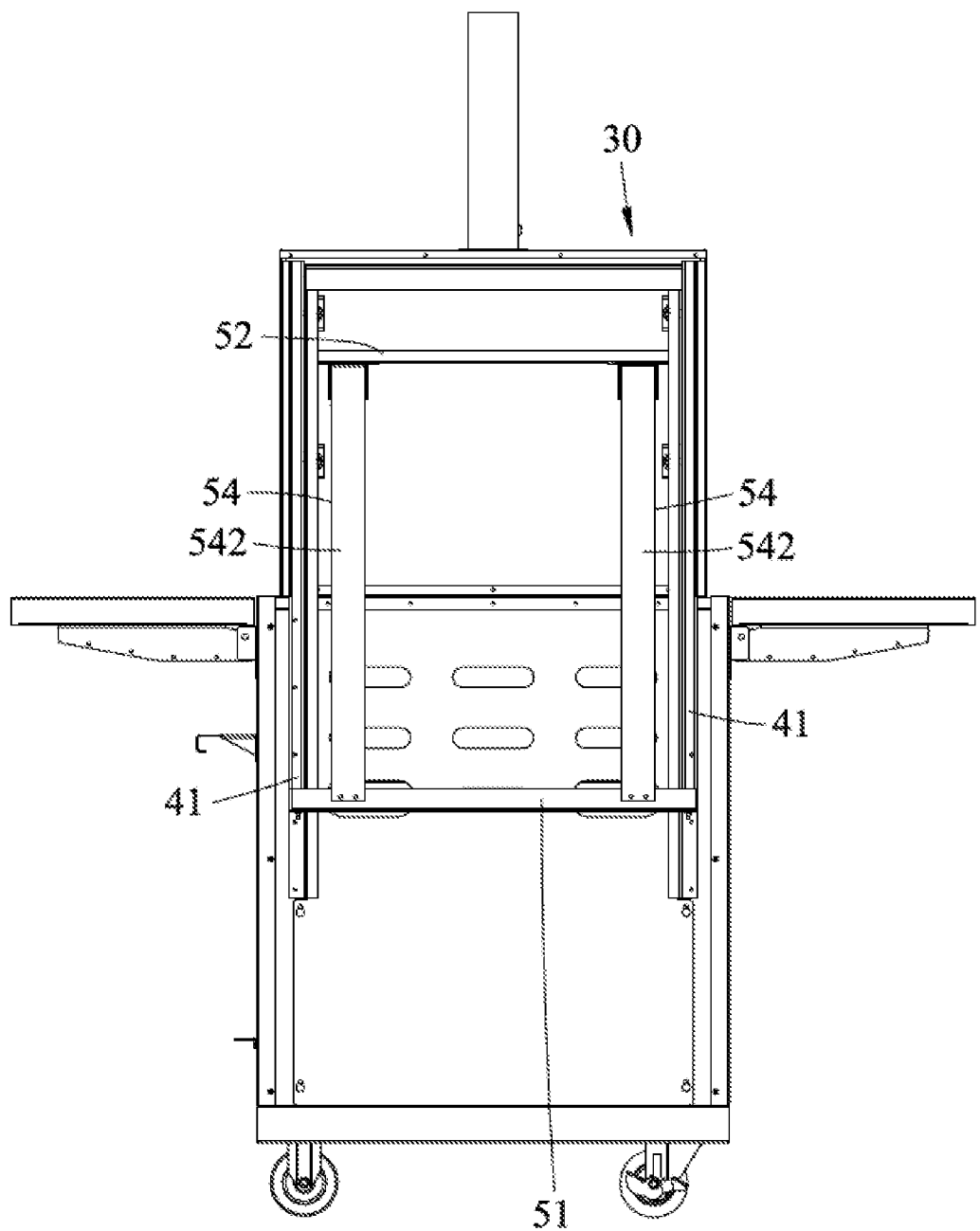
FIG. 13 is another rear view of the embodiment, illustrating the cover unit at the covered position.

During the movement of the cover unit 30 in the top-bottom direction (Z), the constant-force springs 54 provide a substantially constant resilient force (F1) which counteracts a weight of the cover unit 30 (F2) to position the cover unit 30 at any point between a lifted position (see FIGS. 5 and 6), where the cover unit 30 is spaced apart from the top grilling surface 11, and a cover position (see FIGS. 12 and 13), where the cover unit 30 covers the top grilling surface 11.

When the cover unit 30 is at the lifted position, an operator can perform grilling or barbequing action on the top grilling surface 11. The smoke and fume that are generated by grilling or barbequing and that are accumulated in the chamber 37 can be vented out through the exhaust pipe 36.

Referring to FIGS. 3, 8, 12, and 13, when it is desired to perform smoking, the food material is first placed on the gridded plates 22 of the rack unit 20, then the handle 35 is pulled to move the cover unit 30 downward until the cover unit 30 reaches the cover position. During such movement, the spring strip 542 of each of the constant-force springs 54 are stretched, and the first and second roller units 44 enable the guide rails 41 to smoothly slide downward. The cover unit 30 is stably positioned at the cover position, and can be moved to the lifted position again by simply pulling the handle 35 upward.

In summary, by virtue of the configurations of the guiding unit 40 and the balance-providing unit 50, the stove has an enhanced aesthetic appearance compared with that of the above-mentioned conventional stove. Furthermore, smoke and grease generated by grilling and smoking the food material are effectively prevented from getting into contact with the guiding unit 40 and the balance-providing unit 50. By virtue of the first and second roller units 43, 44, the cover unit 30 can smoothly slide in the top-bottom direction (Z) between the lifted position and the cover position.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A stove comprising:
    a hollow stove unit having a top grilling surface, a grill plate that is disposed on said top grilling surface, a heating element that is disposed under said grill plate, and a supporting stand that extends upwardly from a rear end of said top grilling surface in a top-bottom direction;
    a cover unit disposed above said top grilling surface of said stove unit, connected to said supporting stand, and movable in the top-bottom direction, said cover unit including two side walls that are opposite to each other in a left-right direction perpendicular to the top-bottom direction;
    a guiding unit including
        two guide rails that extend in the top-bottom direction, each of said guide rails being disposed fixedly on an inner surface of a respective one of said side walls, and having a surrounding wall that defines a guide groove, and that has an inner wall surface facing said guide groove, an outer wall surface opposite to said inner wall surface, and an opening extending in the top-bottom direction and communicating said guide groove,
        two upright stands that extend in the top-bottom direction, that are coupled fixedly to a rear surface of said supporting stand, and that are disposed between said guide rails,
        a plurality of first roller units that are mounted to said upright stands, each including a first roller rotatably received in said guide groove of a corresponding one of said guide rails, and being in rolling contact with said inner wall surface of said surrounding wall of the corresponding one of said guide rails, and
        a plurality of second roller units, each including a second roller extending through a corresponding one of said upright stands to be in rolling contact with said outer wall surface of said surrounding wall of a corresponding one of said guide rails, such that said guide rails are slidable relative to said upright stands in the top-bottom direction; and
    a balance-providing unit including a crossbar that interconnects and is co-movable with said guide rails, a connect bar that is disposed above and spaced apart from said cross bar and that interconnects said upright stands, at least one mounting seat that is secured to a bottom surface of said connect bar, and at least one constant-force spring that is mounted on said at least one mounting seat and that is connected to said cross bar,
    wherein during the movement of said cover unit in the top-bottom direction, said at least one constant-force spring provides a substantially constant resilient force which counteracts a weight of said cover unit to position said cover unit at any point between a lifted position, where said cover unit is spaced apart from said top grilling surface, and a cover position, where said cover unit covers said top grilling surface.

2. The stove as claimed in claim 1, wherein said balance-providing unit includes two of said mounting seats and two of said constant-force springs that are respectively mounted on said mounting seats.

3. The stove as claimed in claim 2, wherein:
each of said upright stands has a main body, and a fixing plate bent from said main body and coupled fixedly to said rear surface of said supporting stand; and
each of said first roller units further includes a first axial pin extending in the left-right direction through said main body of a corresponding one of said upright stands into said guide groove of a corresponding one of said guide rails via said opening of the corresponding one of said guide rails, said first roller being rotatably mounted to said first axial pin.

4. The stove as claimed in claim 3, wherein each of said second roller units further includes a roller seat coupled to said main body of the corresponding one of said upright stands, and a second axial pin extending through said roller seat in a front-rear direction which is perpendicular to the top-bottom direction and the left-right direction, said second roller being rotatably mounted to said second axial pin.

5. The stove as claimed in claim 2, wherein said connect bar has a bar body extending in the left-right direction, and a plurality of protrusions extending laterally from opposite lateral ends of said bar body, each of said protrusions extending through said main body of a corresponding one of said upright stands.

6. The stove as claimed in claim 2, wherein said cross bar has a base part extending in the left-right direction, and two lateral parts respectively bent from opposite lateral ends of said base part, and respectively and fixedly coupled to said guide rails.

7. The stove as claimed in claim 6, wherein each of said constant-force springs includes a spool disposed rotatably in a respective one of said mounting seats, and a spring strip rolled around said spool and having a connecting portion that is connected fixedly to said base part of said cross bar.

* * * * *